J. SCHIPFER.
RESILIENT WHEEL.
APPLICATION FILED AUG. 28, 1915.
1,163,562.
Patented Dec. 7, 1915.
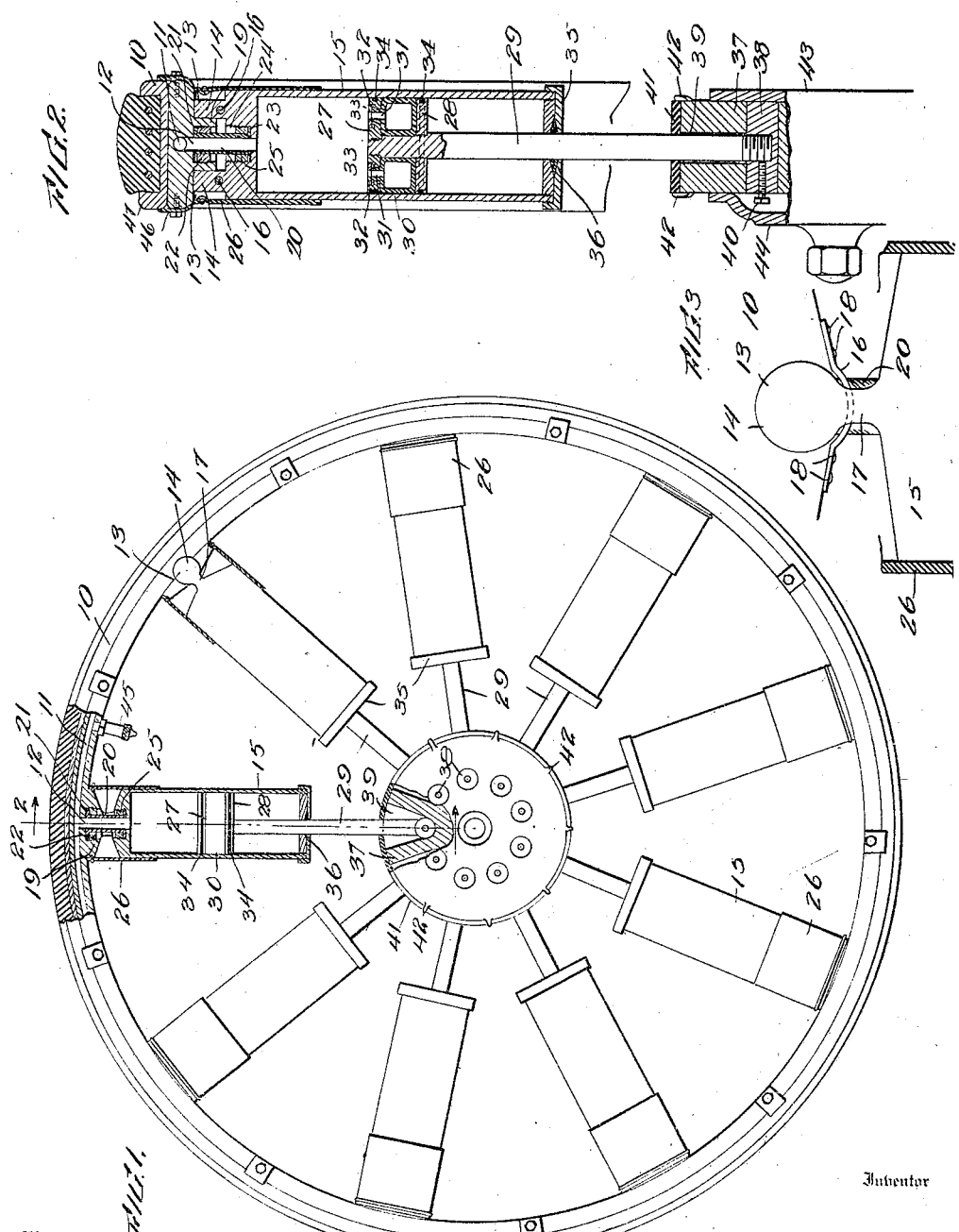

UNITED STATES PATENT OFFICE.

JOHN SCHIPFER, OF NEWPORT, KENTUCKY.

RESILIENT WHEEL.

1,163,562.  Specification of Letters Patent.  Patented Dec. 7, 1915.

Application filed August 28, 1915. Serial No. 47,880.

*To all whom it may concern:*

Be it known that I, JOHN SCHIPFER, a citizen of the United States, residing at Newport, in the county of Campbell and State of Kentucky, have invented certain new and useful Improvements in Resilient Wheels; and I do hereby declare the following to be a full, clear, and exact description of the invention, such as will enable others skilled in the art to which it appertains to make and use the same.

This invention relates to resilient wheels, and especially to that type of wheels wherein the resiliency is the result of air imprisoned within cylinders with pistons acting slidably therein.

A further object of the invention is to provide a new and improved type of structure for connecting the cylinder and piston to the rim and hub respectively.

A further object of the invention is to provide a rim having a continuous passage thereabout, and with improved flexible connections between the cylinders and the continuous passage of the rim.

A further object of the invention is to provide a new and improved type of piston operating in the cylinders wherein the pressure of the packing is at all time equal to the tension of the air within the cylinders.

With these and other objects in view the invention consists in certain novel features of construction, combination and arrangement of parts as will be hereinafter more fully described and claimed.

In the drawings:—Figure 1 is a view of a wheel in side elevation, showing one of the cylinders in diametrical section, and the piston in side elevation. Fig. 2 is a diametrical sectional view of the cylinder taken on a plane at right angles to the plane of Fig. 1, showing also the piston in diametrical section. Fig. 3 is an enlarged detail view of the connection between the cylinder and the rim.

Like characters of reference designate corresponding parts throughout the several views.

The improved wheel which forms the subject-matter of this application comprises a rim 10 having a passage 11 entirely around said rim, and with radial passages 12 spaced at predetermined intervals about said rim.

The rim is provided with bearings 13 into which are inserted the ears 14 of the cylinders 15. The ears are retained in such bearings by means of a strap 16 inserted through an arcuate opening in the shank 17 between the cylinder 15 and the ears 14, such strap being rigidly and permanently secured to the rim 10 in any approved manner as by the rivets 18.

Intermediate the ears 14 the rim is provided with an internally screw-threaded boss 19 into which is inserted a flexible tube 20 having a flange 21 upon one end engaged and held rigidly in position by the screw-threaded collar 22, and with a similar flange 23 at the opposite end held in the screw-threaded socket 24 at the end of the cylinder by means of the screw-threaded collar 25. It will thus be seen that by the action of the ear 14 in the bearings 13 and the flexible connection formed by the flexible tube 20 a flexible connection is provided between the cylinder 15 and the opening 11 in the rim. Surrounding the joint thus formed is a flexible sleeve 26, the only function of which is to exclude dirt and extraneous matter from the hinged joint.

Within the cylinder is a piston having opposed heads 27 and 28 secured upon the piston rod 29. Intermediate the piston heads 27 and 28 is an elastic bag 30 being in the form of a hollow annulus surrounding the piston rod 29 and having its outer wall bearing against the inner wall of the cylinder. The bag 30 is provided with one or more nipples 31, having flanges 32 engaged by screw-threaded rings 33 which, being perforate and the perforation communicating with the passage of the nipple 31, forms continuous communication between the chamber of the cylinder and the chamber of the elastic bag 30.

It is obvious therefore that as air is compressed in front of the piston it will enter through the nipples 31 into the bag 30 and expand such bag with the sides into engagement with the walls of the cylinder, thereby forming a packing which will resist the passage of air with the same force as the tension of the air itself having a tendency to pass such piston. By this means a self-packing piston is provided, although for initial operation packing 34 is also provided.

The piston rod 29 passes through a gland 35 with packing 36 therein simply for the purpose of excluding dirt and extraneous matter from the cylinder.

The piston rod 29 is secured to the hub 37 by having the extremities of said rod engaging cross-heads 38, the rod 29 being inserted into V-shaped slots 39 for engaging such cross-heads 38, and a set screw 40 being employed to prevent the disengagement of the rod 29 from the cross-head 38. About the hub 37 and covering the several V-shaped slots 39 is a flexible band 41 held in position by lugs 42 while covering disks 43 and 44 cover the extremities of the cross-head 38 to prevent the introduction of dirt.

I claim:—

1. A resilient wheel comprising a rim having a chamber therein, a cylinder hingedly connected with the rim, a flexible tubular connection between the cylinder and the chamber of the rim, a piston in the cylinder, a hub, and hinged connection between the hub and the piston rod.

2. In a resilient wheel, a cylinder, a piston within the cylinder having opposed heads, an annular elastic bag disposed between the heads and having its outer walls engaging the inner walls of the cylinder, hollow nipples formed upon the bag and in communication with the cylinder in front of the piston.

In testimony whereof I affix my signature in presence of two witnesses.

JOHN SCHIPFER.

Witnesses:
 ROBT. T. LANG,
 E. V. FENWIK.